Aug. 28, 1945.   G. G. LANDIS ET AL   2,383,503
WORK SUPPORT
Filed July 30, 1943   2 Sheets-Sheet 1

INVENTORS
GEORGE G. LANDIS and
BY   NORMAN J. HOENIE

Oberlin Limbach & Day
ATTORNEYS

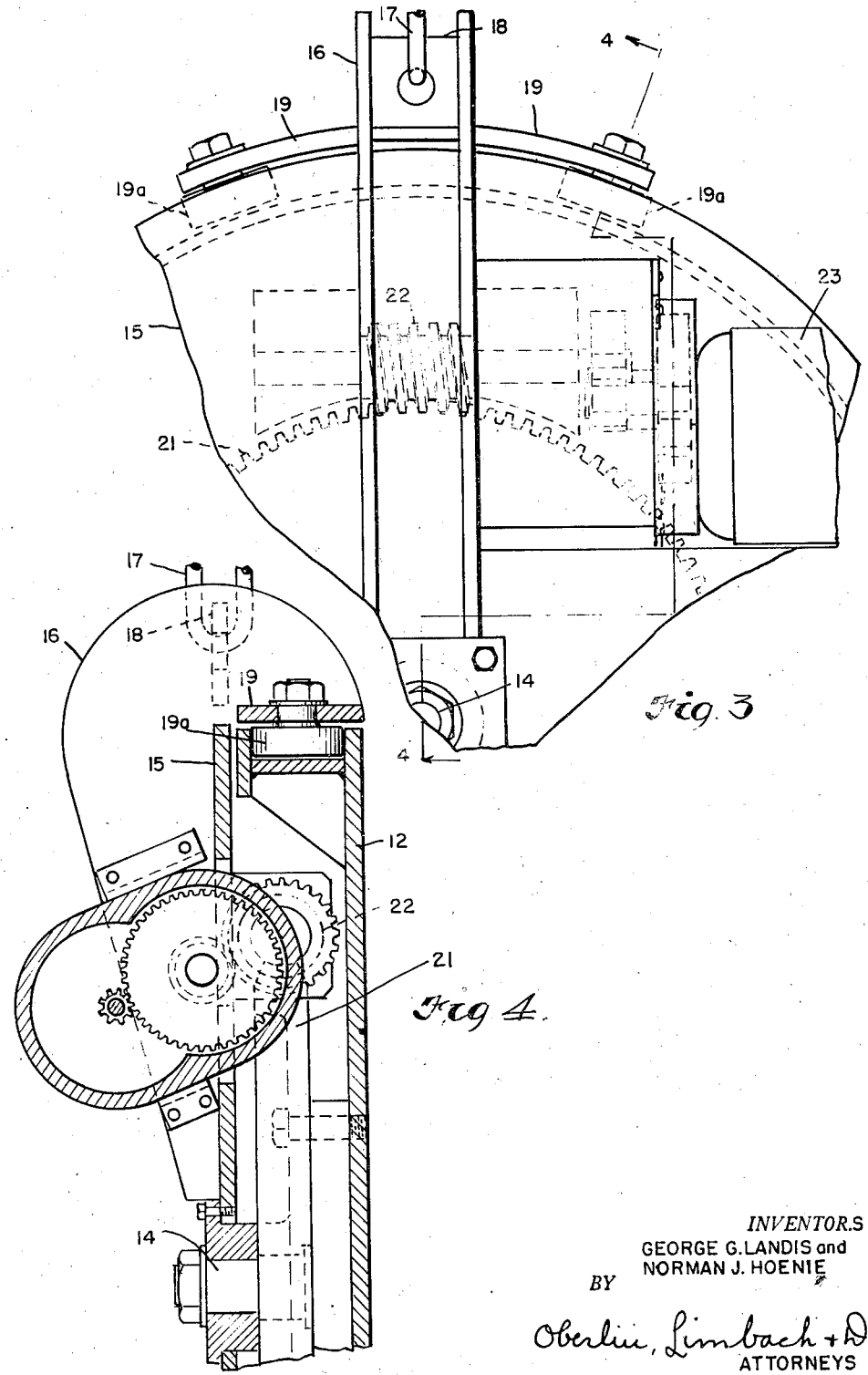

Patented Aug. 28, 1945

2,383,503

UNITED STATES PATENT OFFICE 2,383,503

WORK SUPPORT

George G. Landis, South Euclid, and Norman J. Hoenie, Cleveland Heights, Ohio, assignors to The Lincoln Electric Company, Cleveland, Ohio, a corporation of Ohio Application July 30, 1943, Serial No. 496,736

5 Claims. (Cl. 29—284)

The present improvements, relating as indicated to work supports, have more particular regard to supports for relatively large and cumbersome work-pieces, the handling of which while performing various mechanical or other operations thereon has always constituted a serious shop problem.

While primarily designed to meet such problem in connection with the handling of work-pieces in weld shops, i. e. shops in which welding operations are performed either by the electric arc or gas torch, our improved work support or holder functions in the same manner and is equally advantageous for use in a variety of operations on pieces of the character described whether such operations be welding, riveting, painting or any other in which ready access by the workman to all sides and parts of the piece being operated upon is a consideration of importance.

So far as we are aware, such work supports have always heretofore consisted of a base on which the work-holding means proper are mounted so as to be capable of adjustment to desired various positions, as well as to engage and hold the work-piece. In other words, such work holder has been a relatively stationary piece of apparatus or fixture in the plant to which the work-piece to be operated on requires to be brought and thence delivered by other means. In counterdistinction to the foregoing, we propose to associate directly with such work transporting means devices designed to hold or support the work, which, operating in conjunction with such supporting means, are adaptable thus to support the work in any desired position that may be required for the convenience of the workman operating thereon. No fixed support or set-up being involved, the work-piece may be thus handled at any point in the shop or factory space selected for the purpose; successive pieces may be operated upon at different places; and the means employed thus to support or hold the work while being operated on may be utilized both to bring up the piece to desired station and to remove it when the operation thereon has been completed.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 3 is a part section, part elevation of such part;

Fig. 4 is a vertical central section through such part as indicated by the line 4—4 on Fig. 2.

Figure 1:
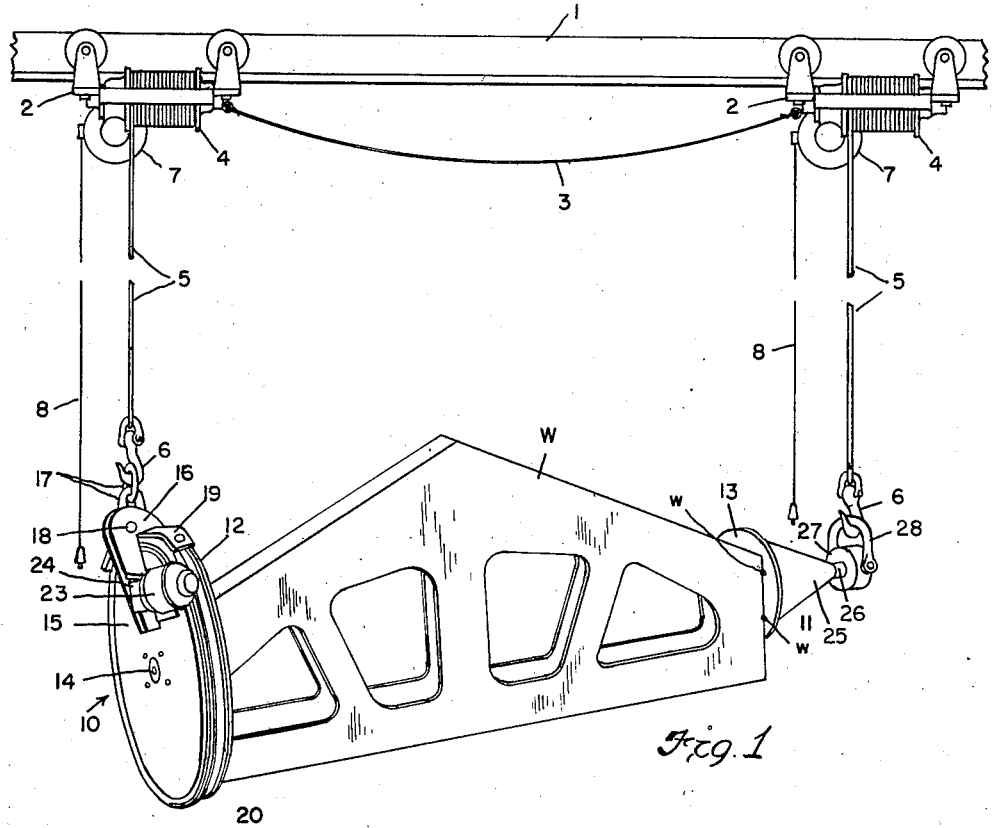
Fig. 1 is in part a side elevation and in part a perspective view of an illustrative work supporting mechanism or apparatus embodying our present improvements.

Our improved work support or holder, as illustrated in Fig. 1, is designed to be used in conjunction with an overhead trackway, such as a monorail 1, on which a suitable carriage is adapted to run. This carriage may be either self-propelled or capable of being pulled along such trackway, and may take on any of the numerous forms familiarly used in shops for handling materials and parts. Preferably, however, such carriage will consist of two separate trolleys or dollies 2, 2, which may be more or less loosely coupled together as by a cable length 3, so that one may be capable of pulling the other if desired and yet leave such trolleys free to approach each other closely when required. Each such trolley is provided with a winding drum 4 equipped with a depending cable 5 having a hook 6 on the lower end thereof. This drum may be operated by hand through the means usually provided for such operation or, preferably, it will be reversibly driven by means of an attached electric motor 7 equipped with a switch that is operable by a pull cord 8.

The work supporting means proper comprise two principal members which for convenience we shall term a head stock 10 and tail stock 11, respectively. Such members respectively include plates 12 and 13, which, when in use to support a work-piece, will be disposed so as to face each other in parallel vertical planes. Such plates 12 and 13 are furthermore so mounted in the members as to be capable of rotative movement about a common axis when the plates are disposed in the manner just referred to.

In the case of head stock 10 the corresponding plate 12 is of circular or disk form and is provided with a stud shaft 14 journalled in a companion plate 15. The latter is provided at one point in its periphery with a double bracket 16 between the parts of which one or more links 17 are secured by means of a pin 18. Associated with such bracket are laterally projecting arms 19 which carry rollers disposed to engage a circumferential groove 20 in disk 12 and thus relieve stud shaft 14 from undue lateral strain when a work-piece is attached to said disk as will be presently described.

As best shown in Fig. 4, said plate or disk 12 has attached thereto on its face adjacent disk 15 a worm gear 21. Engaging the latter is a worm 22 mounted on disk 15 adjacent bracket 16, such worm being connected, through suitable reduction gearing, to be driven by an electric motor 23 similarly mounted on disk 15. This motor is reversible and is provided with a switch 24 whereby it may be driven in either direction or stopped as desired. It will therefore be seen that motor 23 with such worm and worm gear connection to disk 12 constitutes indexing means for the head stock 10, whereby disk 12, forming a part of said head stock, may be rotated in either direction or held in any selected axial position relatively to the companion plate or disk 15. In other words, the whole constitutes an indexing mechanism for the work-piece, when the latter is attached thereto, such mechanism being supported from above by flexible, vertically adjustable means.

The tail stock 11 is of relatively simple construction comprising in addition to plate 13, which is likewise preferably of circular form just as in the case of plate 12, a conical housing 25 that extends axially from one face of the plate or disk and terminates in a stud shaft 26. The latter is received in a journal block 27 to which is attached a link or clevis 28.

The work-piece W, as illustrated in Fig. 1, comprises preassembled parts of a hollow or box truss for the operation to be performed thereon, which by way of example, may consist in finally welding the parts thereof together along both interior and exterior lines of contact. In order to support such work-piece, the above described head stock and tail stock of our improved mechanism are brought into contact with the respective ends of the piece as shown in Fig. 1 and securely attached thereto as by tack welding at a suitable number of points, two of which w, w appear at the right in said figure. It will of course be understood that, depending upon the character and size of the work-piece and of the operation to be performed thereon, any other desired means for securing the ends thereof to the plates 12 and 13 of the head stock and tail stock, respectively, may be employed. For example, where a number of successive operations are to be performed on identical pieces, said plates 12 and 13 may be provided with suitable clamps, collets, or the like, capable of engaging the corresponding ends of the work-piece, but in a weld shop it will ordinarily be more convenient and satisfactory simply to tack weld the ends of the latter to the corresponding plates or disks, and upon completion of the welding or other operations on the piece such ends are then simply chipped or cut loose.

In attaching the plates 12 or 13 of the head stock or tail stock of the work-piece, the respective stud shafts 14 and 26 thereof will be brought into approximate axial alignment. Thereupon, by engaging the cables 5 of the respective trolleys 2 with the links 17 and 28 of said head stock and tail stock, the latter, together with the work-piece held therebetween, may be lifted from the floor or elsewhere to any desired elevation. Furthermore, by winding in one or the other of said cables 5, the corresponding end of the work-piece may be raised above the other end to cause such work-piece to assume any desired angle; indeed the latter may be brought into a substantially vertical position with either end up and the other down. Finally, while occupying any such position, by suitable operation of motor 24 on head stock 10 the disk 12 thereof, together with the work-piece, may be indexed as desired, i. e. caused to rotate about the axis defined by the stud shafts 14 and 26.

The switches whereby the motors that operate the cable winding mechanism or drums 4 on the trolleys, as well as the switch for motor 24, may all be controlled by cords depending within convenient reach of the operator working on piece W so that as such work progresses the position of the piece may be promptly shifted without effort on his part to such position as best suits his purpose. The carriage, constituted of trolleys 2, 2, or the latter employed separately, will be conveniently utilized to bring the work-pieces from the stock pile to the point where they are to be operated upon and may similarly be utilized to remove the finished work-piece to any point to which the overhead conveying system may be carried.

Figures 2, 5:
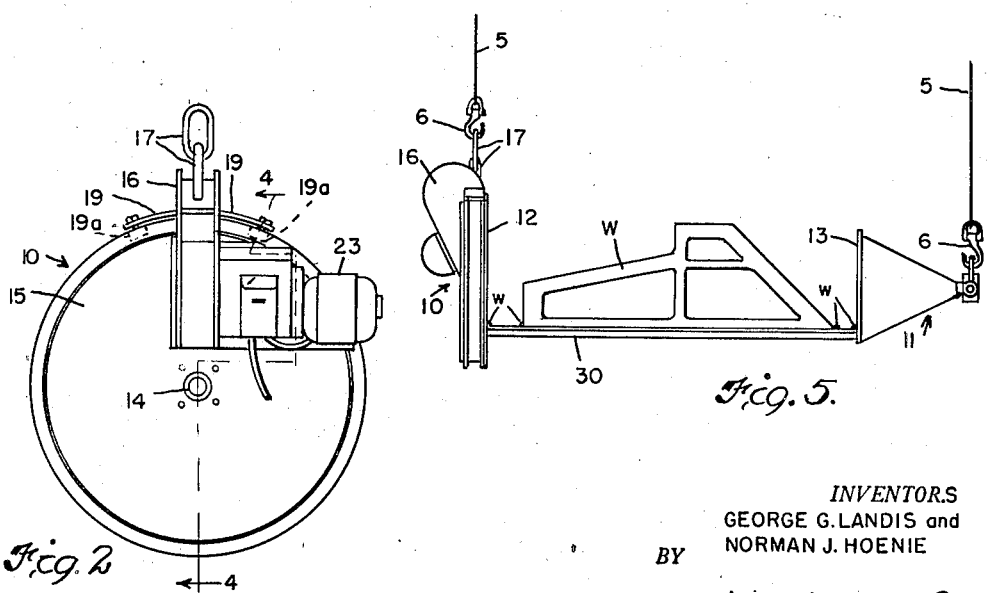
Fig. 2 is an end elevation of one principal part of such apparatus.
Fig. 5 is a side elevation on the order of Fig. 1 but showing a modification in construction of the apparatus.

Instead of directly securing the work-piece between the head stock and tail stock as by attaching the same to disks 12 and 13 in the manner hereinbefore described, the latter, as illustrated in Fig. 5, may be joined by a plate or frame 30 which constitutes a cradle to which the work-piece is then in turn secured. As before, the work-piece may be attached to this cradle either by tack welding or by clamps or other means as found most convenient. By making such frame of open structure all parts of the work-piece are rendered substantially as accessible as where the latter is directly supported between the head stock and tail stock. Accordingly, it will be understood that in referring herein, and in the claims which follow, to the work-piece as having its respective ends secured to the head stock and tail stock, such ends may be thus secured either directly or through an intermediate mounting such as the cradle just described.

Whether the work-piece be secured to such head stock and tail stock or to a cradle such as last described, as a measure of safety for the workman operating on the work-piece, one or more horses will desirably be disposed below the latter if it is suspended from the cables 5 so that if one of the latter or any part of the apparatus should give way the work-piece would drop only a limited distance, and in any event enable the workman to remain clear thereof. The advantages in the employment of a work support or holder constructed as described above will be readily apparent, particularly in the handling of large pieces on which operations such as welding are to be performed. The mechanism is instantly adjustable to receive and support pieces of various shapes and sizes; the handling thereof is not only an extremely simple and easy matter, but directly under the control of the operator working on the piece; and the same means which are employed thus to support the work while being operated on are utilizable to assemble the work on the job, and after it is completed, to remove it. An equally important advantage is that no special floor space needs to be assigned for the performance of a particular operation since the mechanism does not rest on the floor except incidentally to the assembly of the work-piece between the two principal supporting members.

While we have referred to the plates on the head stock and tail stock, when the work-piece is mounted therebetween, as being disposed so as to face each other in parallel, vertical planes, it will be obvious from the foregoing description that whether the plates are thus vertically disposed will depend upon their relative position. In other words, by shortening the one flexible support relatively to the other, the plates in question may be caused to lie in substantially horizontal planes, one above the other, or at any desired angle. It will likewise be understood that such plates need not be in strict parallel relationship, as this will depend upon the shape of the work-piece, or rather of the respective portions thereof which are attached to the head stock and tail stock. Obviously, where the attachment plates of the latter are in non-parallel relation, the axes about which they rotate will not be in strict alignment or constitute a common axis, although the work-piece may still be said to be rotatable about an axis defined by said stocks.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. In a work support, the combination with a head stock and a tail stock, whereto when approximately axially aligned the ends of a work-piece may be secured; of flexible supports wherefrom said stocks are respectively suspended, said supports being relatively, vertically, as well as horizontally, movable means adapted thus to move said supports; and means adapted to index said head stock irrespective of its position due to such movement of said supports.

2. The combination of an overhead travelling carriage; two cables depending therefrom; means on said carriage adapted to wind and unwind said cables independently of each other; and a head stock suspended from one such cable and a tail stock from the other, whereto when approximately axially aligned the ends of a work-piece may be secured, said head stock including an indexing mechanism whereby a work-piece secured as stated may be rotated and held in desired position about its axis.

3. The combination of an overhead travelling carriage; two cables depending therefrom; means on said carriage adapted to wind and unwind said cables independently of each other; and a head stock suspended from one such cable and a tail stock from the other, whereto when approximately axially aligned the ends of a work-piece may be secured, said head stock including a power operated indexing mechanism carried thereby whereby a work-piece secured as stated may be rotated and held in desired position about its axis.

4. In a work support, the combination with a head stock and a tail stock, whereto when approximately axially aligned the ends of a work-piece may be secured; supporting means for said head stock arranged and constructed to provide for oscillatory movement thereof in a vertical plane, as well as rotative movement about such axis; a depending cable wherefrom said tail stock is suspended; and means adapted to wind and unwind said cable thus to oscillate said head stock and tail stock with work-piece secured therebetween.

5. In a work support, the combination with a head stock and a tail stock, whereto when approximately axially aligned the ends of a work-piece may be secured; supporting means for said head stock arranged and constructed to provide for oscillatory movement thereof in a vertical plane, as well as rotative movement about such axis; a depending cable wherefrom said tail stock is suspended; means adapted to wind and unwind said cable thus to oscillate said head stock and tail stock with work-piece secured therebetween; and indexing mechanism included in said head stock, whereby a work-piece secured as stated may be rotated and held in desired position about such axis.

GEORGE G. LANDIS.
NORMAN J. HOENIE.